United States Patent [19]

Kricker

[11] Patent Number: 4,480,224

[45] Date of Patent: Oct. 30, 1984

[54] SYSTEM FOR INDICATING THE DIRECTION AND NET DISTANCE TRAVELLED BY A MEDIUM CONTAINING A PERIODIC ASYMMETRICAL FLUX PATTERN

[76] Inventor: Ralph Kricker, 225 W. Walk, West Haven, Conn. 06516

[21] Appl. No.: 332,549

[22] Filed: Dec. 21, 1981

[51] Int. Cl.³ .............................................. G01B 7/14
[52] U.S. Cl. .................................. 324/207; 340/672; 177/DIG. 3
[58] Field of Search ...................... 324/165, 207, 208; 377/17, 18; 340/672; 177/DIG. 3

[56] References Cited

U.S. PATENT DOCUMENTS 2,926,335  2/1960  Bower ................................. 340/672
3,969,677  7/1976  Woyton ............................... 324/165

Primary Examiner—Gerard R. Strecker
Assistant Examiner—Walter E. Snow
Attorney, Agent, or Firm—Leonard J. Platt

[57] ABSTRACT

In a system for displaying the net distance travelled by a magnetic recording tape, the tape includes a recorded track having a periodic flux pattern. During each period, the flux pattern includes an asymmetrical pulse characterized by a flux increase during a first length of tape and a flux decrease of the same magnitude during a second and different length of tape. A single flux responsive head detects the pulses when the tape is moved and a differentiating circuit provides a pulse signal whose sense is related to the directions of travel of the tape. The pulse signal is coupled to an up-down counter which drives a display. The display indicates the net distance travelled by the tape.

3 Claims, 5 Drawing Figures

SYSTEM FOR INDICATING THE DIRECTION AND NET DISTANCE TRAVELLED BY A MEDIUM CONTAINING A PERIODIC ASYMMETRICAL FLUX PATTERN

BACKGROUND OF THE INVENTION

1. Field of the Invention

The subject invention relates to systems useful to measure the net displacement relative to a fixed position of a member movable in forward and reverse directions. The present system can be used in combination with tape players/recorders to monitor the amount of magnetic tape transferred from a pay-out to a take-up spool or, with an appropriate spool drive mechanism, can be used to monitor the weight loading of a platform found in weight measuring scales.

2. Description of Prior Art

Prior art considered to be relevant herein is disclosed in U.S. Pat. No. 3,597,749, issued to S. Uemura on Aug. 3, 1971, and in U.S. Pat. No. 3,826,318, issued to A. Baumgartner on July 30, 1974.

U.S. Pat. No. 3,597,749 discloses a magnetic medium having periodic magnetic indicia located on one side of the medium. The medium is movable along a predetermined path and a pair of spaced magnetic heads is located adjacent the path to detect movement of the medium, the spacing between the heads being related to the wavelength of the periodic indicia. Each of the heads is driven by one of two sinusoidal signals which are ninety degrees out of phase, and the magnetic indicia. In turn, each of the heads provides a resulting signal to a mixer and the mixer provides an output signal whose detectable phase is related to the position of the medium.

U.S. Pat. No. 3,826,318 discloses a digital scale having an incremental measuring system. The scale includes a source of light, a weight-indicating movable grid, and a stationary grid, all in optical alignment. The movable grid includes alternately disposed transparent and non-transparent vertical surfaces, the spacing between the surfaces increasing in one direction, and the stationary grid including upper and lower relatively displaced sets of transparent and non-transparent vertical surfaces. With the source of light on, relative motion between the grids causes a pair of light signals to be transmitted by the grids, one of the signals being transmitted through the upper transparent vertical surfaces of the stationary grid and the other of the signals being transmitted through the lower transparent vertical surfaces of the stationary grid. Photoelectric means, including a pair of photoelements, produce leading and lagging electrical signals when said pair of light signals are transmitted. In operation, when the movable grid responds to weight and moves in one direction, the electrical signals corresponding to the upper transparent surfaces leads the electrical signal corresponding to the lower transparent surfaces and this phase relationship is reversed when the direction of travel of the movable grid reverses. An electrical discriminator determines which of the signals leads and provides pulses to an up-down counter used to record weight.

While the disclosures of the foregoing patents differ in many respects, it is noted that they are similar in that in each case two simultaneously occuring signals are separately detected to determine the position of a movable member, i.e., the magnetic medium or the movable grid.

SUMMARY OF THE INVENTION

It is an object of the present invention to provide a movement sensing mechanism which can advantageously be used in an electronic weight measuring scale.

It is an object of the present invention to provide a system capable of indicating accurately the net relative displacement of a movable member or the net distance travelled by the movable member along a predetermined path. The movable member can be flexible or rigid, and is preferably movable in forward and reverse directions.

It is another object of the present invention to provide a system for indicating accurately the net amount of magnetic tape displaced relative to or moved past a fixed positioned sensing means. The system in a preferred embodiment requires only a single magnetic pick-up head.

It is still another object of the present invention to provide the movable member with at least one surface capable of recording magnetic signals thereon. The movable member can be a magnetic recording medium or alternatively have a magnetic recording tape fixedly applied to a surface thereof. The tape is recorded with a longitudinally extending periodic flux pattern. A sensing means responsive to the magnitude of the periodic flux pattern is positioned relative to the tape and provides a voltage signal in proportion to the flux level which is sensed as the tape is moved past the sensing means. In a preferred embodiment the sensing means comprises a variable-reluctance magnetic read head which provides an output voltage which is proportional to the magnitude of the recorded flux pattern and is generally independent of the tape speed. The output voltage of the sensing means can be further processed in an electrical circuit, such as an amplifier, having a limited dynamic range to provide a signal useable for further evaluation.

The invention herein may be described broadly, as a system for measuring the net distance traveled by a movable member along a predetermined path. Equispaced asymmetrical indicia are recorded located on the movable member and as the movable member is displaced, the indicia are moved past a predetermined position on the path. The sensing means is positioned at said predetermined position or relative thereto and responds to the magnitude of the indicia flux patterns which move past said position. Movement of said indicia in a first direction produces a first voltage signal related to movement of the member in said first direction and movement of the indicia past said position in a second direction (a direction opposite to the first direction) produces a second voltage signal related to the movement of the member in the opposite direction. The voltage output of the sensing means is thus independent of the speed at which the tape moves. Tape movement in a first direction provides a voltage signal similar to the flux pattern while movement of the tape in a second direction produces a voltage output waveform which is the mirror image of the waveform. The output of the sensing means is advantageously applied to a pulse shaping circuit wherein the continuous or quasi-continuous voltage waveform is converted to a pulse waveform having positive and negative pulses characteristic of the tape movement in said first and second directions. The pulse shaping circuit in a preferred embodimemt can be a differentiating circuit. The pulse waveform is then applied to an accumulator means or a counting circuit which adds all the positive pulses and subtracts all the negative pulse to provide an indication of the net distance travelled along the predetermined path by the movable member.

BRIEF DESCRIPTION OF THE DRAWINGS

The above-mentioned and other objects and features of the invention will become apparent by reference to the following description in conjunction with the accompanying drawing, in which.

DESCRIPTION OF A PREFERRED EMBODIMENT

Figure 1:
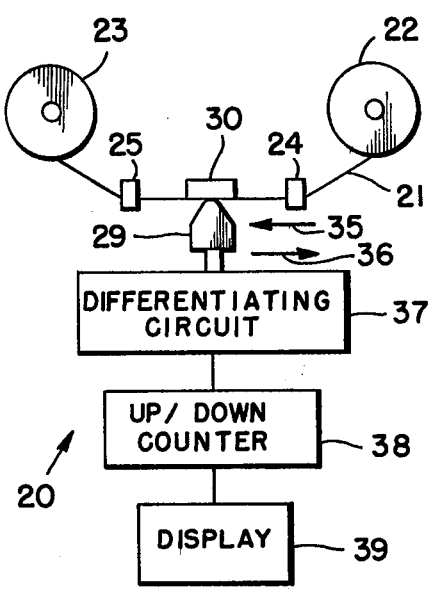
FIG. 1 is a block diagram of a system which embodies the invention.
Figure 2:
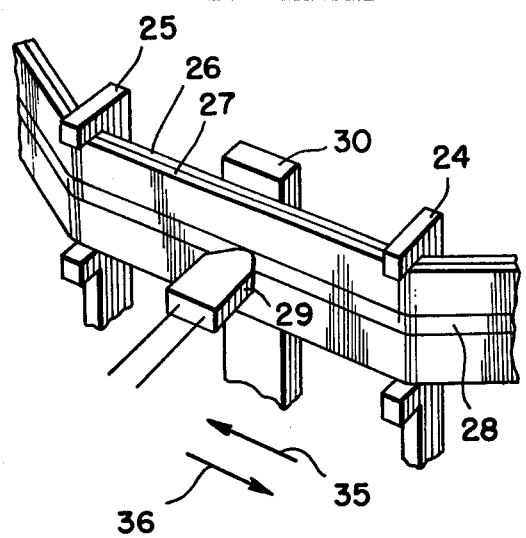
FIG. 2 is a partial perspective view of a movable magnetic tape and a pick-up head which are included in the system represented in FIG. 1.

A block diagram of a system 20, according to the invention, for determining the net distance travelled along a predetermined path by a movable member is shown in FIG. 1. In the system 20 the movable member is shown as a magnetic tape 21 extending between a pair of spools 22 and 23 and passing over a pair of U-shaped guides 24 and 25 which at least partially define said predetermined path of travel for the tape. As best seen by referring to FIGS. 1 and 2, tape 21 is a plastic ribbon 26 having a magnetic recording medium 27, such as is commercially available for use with cassette recorders or the well-known Lear 8-track recording system. Ribbon 26 is biased against the guides 24 and 25 by tension applied to the tape 21 through the spools 22 and 23. The magnetic tape medium 21 includes a recording track 28 having a plurality of equispaced asymmetrical indicia created by recorded flux patterns distributed along the length of the track. The magnitude of the flux of these indicia can be detected by, for instance, a variable reluctance type magnetic pick-up (read) head 29 located at a predetermined position in the path and biased against the tape and a backing member 30. In essence, the tape is partially sandwiched between the head 29 and the backing member 30 to assure a sliding contact between the head 29 and the track portion of the tape 21 as the tape is moved by a drive mechanism (not shown) which rotates the spools and then moves the tape past the head 29 and between the spools 22 and 23.

The spool drive mechanism responds to external control by displacing or moving a prespecified length of tape between spools 22 and 23 and past the sensing means 29. In a weight measuring scale embodiment of the present system, the spool drive mechanism responds to mass or weight loading applied to a weight responsive platform. In an ordinary tape player/recorder tape counter embodiment of the present sensing system, an additional or separate spool drive mechanism is not needed because the track 28 having the equispaced asymmetrical indicia can be included on the player/recorder tape as a separate track in either a prerecorded or an on line fashion.

Figure 3:
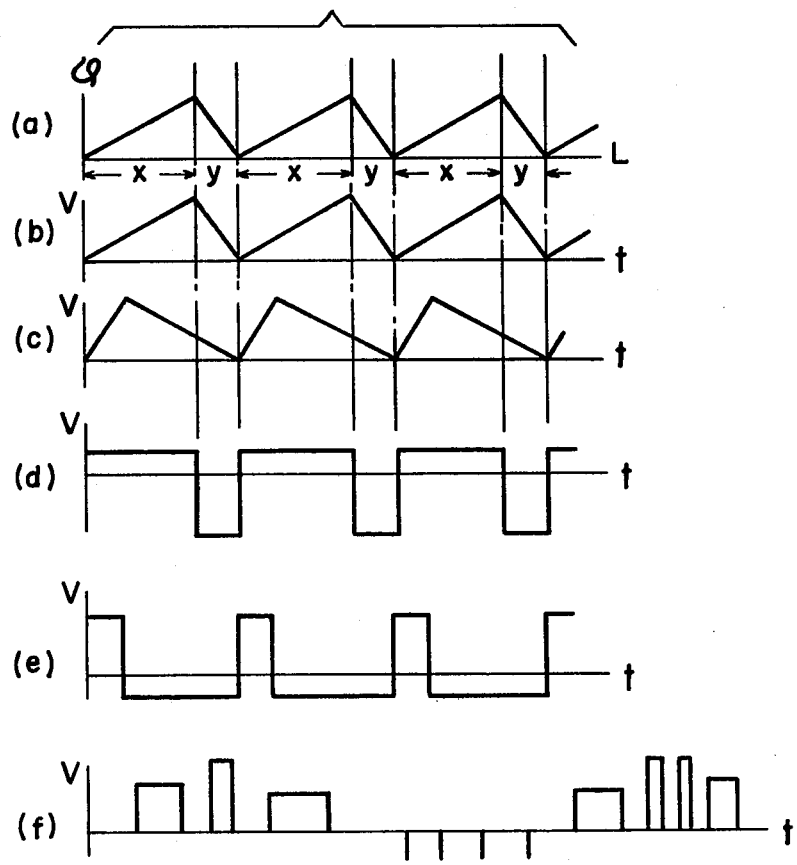
FIG. 3 is a set (a) through (f) of waveforms used in describing the operation of the system.

The equispaced asymmetrical indicia referred to above are, in this example of the invention, a periodic asymmetrical flux pattern disposed along the length of the tape. A flux pattern such as described is shown in waveform (a) of FIG. 3, wherein the ordinate represents flux and the abscissa represents distance along the length of the tape. It should be noted that during each period of the flux pattern, the magnitude of the flux linearly increases and linearly decreases. As seen in FIG. 3(a) the flux linearly increases over a length x and linearly decreases over a length y, wherein $X \neq y$. With present recording capabilities, about 3,000 such pulses can be recorded per inch of tape. As explained below, movement of the tape causes the described asymmetrical pulse flux pattern to generate a detectable voltage signal which includes information related to the magnitude of the length of tape which has been displaced and the direction in which the tape is moved.

Pick-up head 29 is a flux-responsive head which generates a voltage signal whose magnitude is in proportion to the magnitude of the flux sensed. The output voltage of heads of this type is independent of the speed of the tape and the rate of change of the magnitude of the flux. The described head is known in the art as a variable reluctance head and such a head is described by Kerr and Quirk in an article published in the October 1960 edition of the Journal of the British Institute of Radio Engineers.

Alternatively, head 29 can be a flux-responsive head of the type based on the Hall effect, as is described by Anselmo and Oppenheimer in a Sprague Electric Company technical paper.

With tape 21 moving in a first direction, as indicated by arrow 35, at a constant speed, the output of the head is, as shown in waveform (b), a voltage which varies with time as the flux varies along the length L of the tape if it is scanned in one direction. With tape 21 moving in an opposite direction, as indicated by arrow 36, at a constant speed, the output of the head is, as shown in waveform (c), a voltage which varies with time as the flux varies along the length of the tape if it is scanned in an opposite direction. Referring to FIGS. 1 and 3, the output of the pick-up head 29 is applied to the input of a pulse shaping circuit such as a mathematical differentiating circuit 37 which, in response to an input signal such as shown in waveform (b), provides a negative pulse signal such as shown in waveform (d) and in response to an input signal such as shown in waveform (c), provides a positive pulse signal such as shown in waveform (e). It should be noted that movement of the tape in the direction indicated by arrow 35 provides a pulse signal of negative sense and movement of the tape in the direction indicated by arrow 36 provides a pulse signal of positive sense, the number of pulses provided being proportional to the distance travelled by the tape. Should the tape for instance alternatively travel in first and second directions several times, circuit 37 will provide a series of positive and negative voltage pulses (see waveform (f)), the positive pulses of which may be considered as a first signal related to cumulative movement of the tape in direction 36 and the negative pulses of which can be considered as a second signal related to cumulative movement of the tape in direction 35. Significantly, the algebraic sum of the pulses provides a measure of the net distance travelled by the tape. As more fully described below, system 20 includes an up-down counter 38 and a display 39 to provide, in response to the first and second signal an indication of the net distance travelled by the tape.

Figure 4:
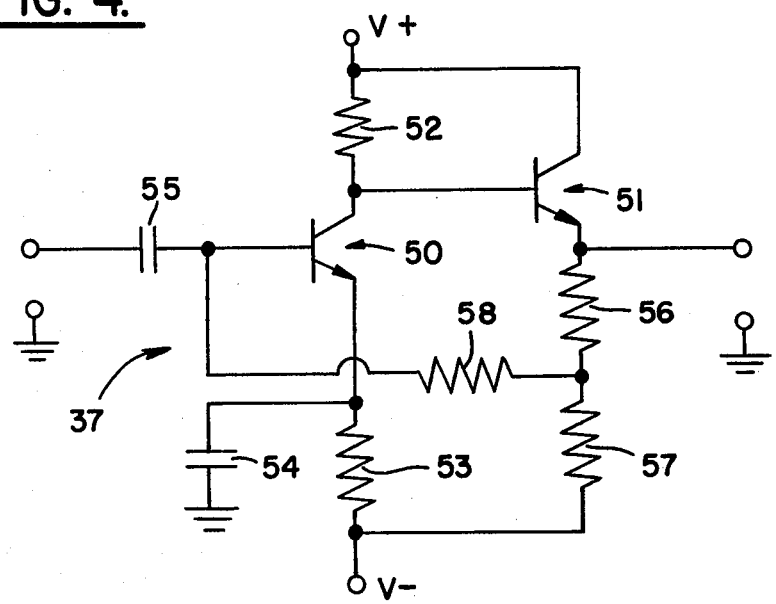
FIG. 4 is a schematic diagram of a typical differentiating circuit which is used in an embodiment of the system.

Referring to FIGS. 1 and 4, differentiating circuit 37 can be implemented in many ways, one of which includes a pair of NPN transistors 50 and 51. Transistor 50 has its collector coupled by a resistor 52 to the positive terminal V+ of a battery (not shown) and its emitter coupled to the negative terminal of the battery by a bias resistor 53. Resistor 53 is by-passed by a capacitor 54 coupled between the emitter and ground. Input signals to this circuit are coupled to the base of transistor 50 by a capacitor 55 and output signals from the collector of this transistor are coupled to the base of transistor 51. The collector of transistor 51 is connected directly to the V+ terminal and its emitter is connected to the V-terminal by series-connected resistors 56 and 57. The connection of resistors 56 and 57 is also coupled to the base of transistor 50 by a feedback resistor 58. During operation, output signals are provided between the emitter of transistor 51 and ground. Persons skilled in the circuit arts will recognize the foregoing as a phase-inverting amplifier with capacitive input coupling and resistance feedback, a circuit which readily differentiates input signals when the gain of the amplifier is much greater than one.

Figure 5:
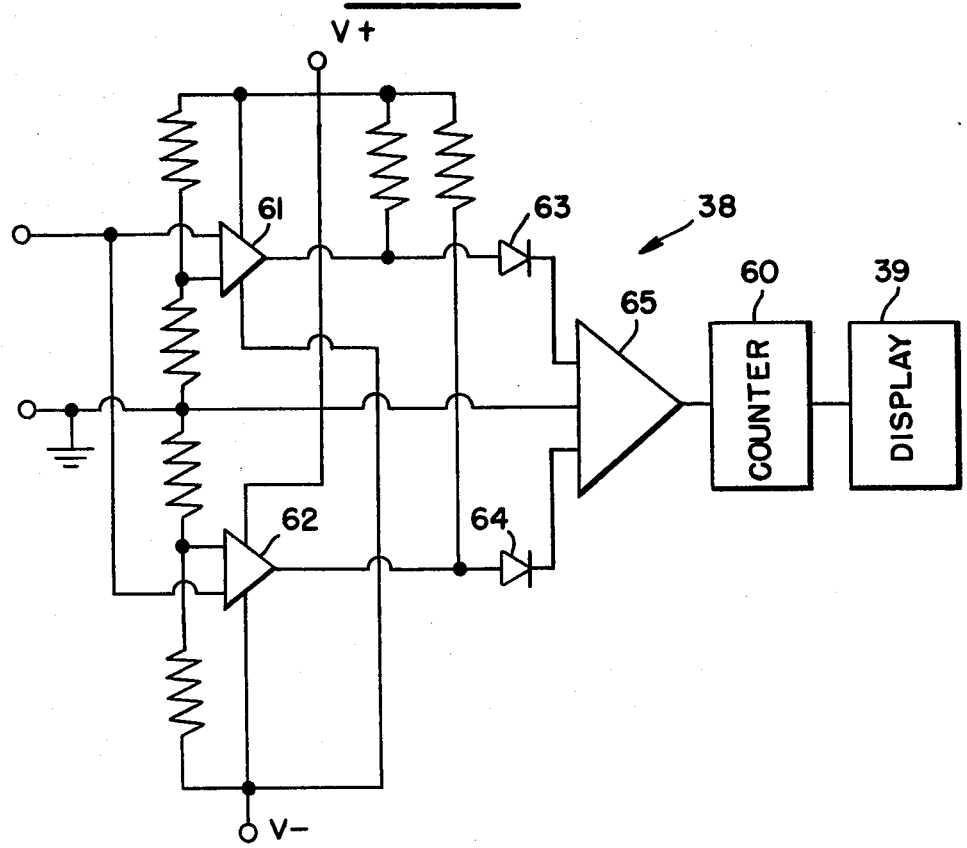
FIG. 5 is a schematic diagram of a counting and display circuit used in an embodiment of the system.

The output of the differentiating circuit is, as shown in FIGS. 1 and 5, connected to an up-down counter 38. Counter 38 includes a drive circuit whose logic is such that positive pulses will trigger one output and negative pulses another output. The drive circuit provides an input to a counter 60 such as the RCA CD-4029 unit and the RCA unit drives a digital display which can be of the liquid crystal or LED type. The drive circuit includes two properly biased half sections 61 and 62 of operational amplifier LF 2155, sold by Texas Instruments Inc. The output of each of the sections 61 and 62 is coupled by diodes 63 and 64, respectively, to a differential comparator 65. Differential comparator 65 can be a TL 710 unit such as is sold by Texas Instruments Inc.

In the system described, single sensor means, including the pick-up head 29 and differentiating circuit 37, provides a bi-polar signal having first and second distinguishable component signals when the tape is moved back and forth and a counter 38 responsive to the component signals drives a display which in turn indicates the net distance travelled by the tape. The system may be thought of as including a recorded magnetic tape which generates at a point when the tape is moved, a first detectable magnetic signal related to the cumulative distance travelled by said member in a first direction and for generating a second detectable magnetic signal related to the cumulative distance travelled in an opposite direction. A single sensor arrangement, including the pick-up head 29 located at said point, the differentiating circuit 37, counter 38 and display 39, provides an indication of the net distance travelled by the tape.

The apparatus described above may be modified by artisans in ways which are consistent with the spirit of the invention. Therefore, it should be understood that the description herein of a preferred embodiment, according to the invention, has been set forth as an example thereof and should not be construed or interpreted to limit the scope of the claims which follow and define the invention.

I claim:

1. A system for indicating the net distance and direction travelled along a predetermined path by a magnetic recording medium,
   (a) a periodic asymmetrical flux pattern located on said medium for movement past a position on said predetermined path when said medium is moved;
   (b) single sensor means responsive to movement of said flux pattern past said position for producing first signals in response to passage of said flux pattern in a first direction and for producing second signals differing from said first signals in response to passage of said flux pattern in a second direction;
   (c) means responsive to each of said first signals for generating a positive pulse and to each of said second signals for generating a negative pulse; and
   (d) means for counting the positive and negative pulses to net an algebraic sum, said sum providing an indication of the direction and net distance travelled along said predetermined path by said movable medium.

2. The system of claim 1 wherein said periodic asymmetrical flux pattern comprises magnetic recordings of approximately identical configuration having an increasing flux magnitude over a distance x and a decreasing flux magnitude over a distance y and x≠y, and in which said first and second signals are voltage output signals representative of the magnitude of the flux pattern directed.

3. The system of claim 1 wherein said counting means is a pulse counting circuit, which counts the number of said positive pulses in excess of the number of said negative pulses and produces a voltage output characteristic of the net distance travelled by said movable medium.

* * * * *